United States Patent
McMullin

(10) Patent No.: US 6,222,914 B1
(45) Date of Patent: Apr. 24, 2001

(54) SYSTEM AND METHOD FOR ADMINISTRATION OF AN INCENTIVE AWARD SYSTEM HAVING A DELAYED AWARD PAYMENT USING A CREDIT INSTRUMENT

(76) Inventor: John L. McMullin, 371 S. Ballas Rd., Kirkwood, MO (US) 63122

( * ) Notice: Subject to any disclaimer, the term of this patent is extended or adjusted under 35 U.S.C. 154(b) by 0 days.

(21) Appl. No.: 09/145,447

(22) Filed: Sep. 2, 1998

(51) Int. Cl.$^7$ .................................................. H04M 15/00
(52) U.S. Cl. .................... 379/144; 379/111; 379/114; 379/121; 705/10; 705/14; 705/26
(58) Field of Search ................... 379/111, 112, 379/114, 116, 121, 123, 124, 143, 144, 154; 705/14, 26, 27, 7, 10, 21; 235/375, 376, 379, 383; 364/401, 402; 382/100, 137, 139

(56) References Cited

U.S. PATENT DOCUMENTS

| | | | |
|---|---|---|---|
| 5,025,372 | 6/1991 | Burton et al. | 364/406 |
| 5,056,019 | * 10/1991 | Schultz | 364/405 |
| 5,210,789 | * 5/1993 | Jeffus et al. | 379/127 |
| 5,608,785 | * 3/1997 | Kasday | 379/90 |
| 5,909,486 | * 6/1999 | Walker et al. | 379/144 |
| 5,991,376 | * 11/1999 | Hennessy et al. | 379/114 |

FOREIGN PATENT DOCUMENTS

WO 96/29668  9/1996  (WO) .

OTHER PUBLICATIONS

Shell MasterCard Application Form From CHASE and Monthly Cycling Bill.*

* cited by examiner

Primary Examiner—Curtis Kuntz
Assistant Examiner—Binh K. Tieu
(74) Attorney, Agent, or Firm—Woodard, Emhardt, Naughton, Moriarty & McNett

(57) ABSTRACT

A system and method for administration of an incentive award program wherein award points are earned in response to certain actions by the Participants and then credited to the Participant's credit card, but only after a predetermined time delay. Furthermore, the Participant must still be a customer in good standing with the credit card Sponsor at the end of this predetermined delay period in order to receive the awarded points. As used herein, the term "credit card" is intended to encompass traditional credit cards, debit cards, smart cards, etc. which are commonly accepted as payment for purchases in place of cash or bank checks. The system of the present invention therefore creates an incentive for the Participant to purchase the Sponsor's goods and/or services in order to earn award points, and further creates an incentive for the Participant to remain a loyal customer of the Sponsor in order to receive and redeem these award points at some point in the future. Each award point therefore serves a double function as a reward for using the Sponsor's products and/or services and also as an incentive for customer loyalty to the Sponsor.

22 Claims, 1 Drawing Sheet

SYSTEM AND METHOD FOR ADMINISTRATION OF AN INCENTIVE AWARD SYSTEM HAVING A DELAYED AWARD PAYMENT USING A CREDIT INSTRUMENT

TECHNICAL FIELD OF THE INVENTION

The present invention generally relates to the field of computer programming and data processing systems for incentive award programs and, more particularly, to a system and method for administration of an incentive award system having a delayed award payment using a credit instrument.

BACKGROUND OF THE INVENTION

Many recent prior art incentive award programs utilize either a credit card or debit card which is issued to the Participant. For example, one such prior art process requires the issuance of a traditional credit card to each incentive program Participant. The Participant's cardholder account is assigned a credit limit which is based upon the Participant's past credit history. Earnings which are accumulated in the incentive award program are then used to "float" this credit limit up to the level of the Participant's assigned credit limit plus any available non-redeemed earnings. The Participant may then use the credit card to make purchases at any merchant honoring the credit card. These purchases will then downgrade the amount of available credit on the cardholder account. After settlement and posting of these purchase transactions into the cardholder's account, the incentive program's administrator may make a payment to the cardholder's account based upon charge amounts and any available program earnings. The Participant/cardholder is then responsible for any outstanding balances above the amount paid by the incentive program administrator. He may choose to pay this amount or allow the balance to revolve, thereby accruing interest charges until paid.

In such prior art systems, incentive award program points may be earned in any way, but it is most common to award points for use of the credit card, either to purchase the Sponsor's products or to purchase any items that may be paid for with the credit card. The incentive award program points therefore are in the nature of a rebate on the prior qualifying purchases.

In the system as just described, points earned by the Participant in the incentive program are converted to dollars whenever purchases are posted to the cardholder's account. At that time, any available points are converted to dollars and the incentive program administrator makes a payment to the credit card issuer (i.e. the Bank that issues the credit card). Under such a scenario, the incentive program administrator retains the money earned through the incentive program until such time as the program Participant makes a purchase with his credit card. This system therefore has the feature that the incentive program administrator keeps track of points earned through the incentive program and then converts these points to dollars immediately after the Participant makes a purchase with the credit card. The Sponsor of such a plan therefore provides an incentive to the Participant to perform the desired action in order to earn the award points, but once the award points are earned, they provide no further incentive to the Participant to perform the desired action. In other words, once the points are awarded, incentive to perform the desired action is only achieved by awarding further points; the previously awarded points don't create any incentive for customer loyalty.

There is therefore a need for a system and method for administration of an incentive award program in which incentive to perform the desired action is achieved not only by a Participant's desire for more award points, but is also achieved by the method by which the points may be redeemed. In particular, there is a need for a system and method for administration of an incentive award program which provides incentive both for performing the desired action and for Participant loyalty to the program. The present invention is directed toward meeting these needs

SUMMARY OF THE INVENTION

The present invention relates to a system and method for administration of an incentive award program wherein award points are earned in response to certain actions by the Participants and then credited to the Participant's credit card, but only after a predetermined time delay. Furthermore, the Participant must still be a customer in good standing with the credit card Sponsor at the end of this predetermined delay period in order to receive the awarded points. As used herein, the term "credit card" is intended to encompass traditional credit cards, debit cards, smart cards, etc. which are commonly accepted as payment for purchases in place of cash or bank checks. The system of the present invention therefore creates an incentive for the Participant to purchase the Sponsor's goods and/or services in order to earn award points, and further creates an incentive for the Participant to remain a loyal customer of the Sponsor in order to receive and redeem these award points at some point in the future. Each award point therefore serves a double function as a reward for using the Sponsor's products and/or services and also as an incentive for customer loyalty to the Sponsor.

In one form of the invention, a method for administration of an incentive award system is disclosed, comprising the steps of: a) issuing a credit card account to a Participant; b) selling goods and/or services of a Sponsor to said Participant; c) charging said sales to said credit card account; d) determining an award amount bases at least in part upon said charges; e) waiting a predetermined length of time; f) determining if said Participant is still a customer in good standing of said Sponsor after said predetermined length of time; and g) if said Participant is determined at step (f) to be a customer in good standing, crediting said award amount to said credit card amount.

In another form of the invention, a method for administration of an incentive award system is disclosed, comprising the steps of: a) causing a credit provider to issue a credit card account to a Participant; b) creating a database containing information about said credit card account; c) selling goods and/or services of a Sponsor to said Participant; d) charging said sales to said credit card account; e) using computer data processing means to calculate an award amount based at least in part upon said charges; f) waiting a predetermined length of time; and g) determining if said participant is still a customer in good standing of said Sponsor after said predetermined length of time; and h) causing said award amount to be credited to said credit card account information if said Participant is determined at step (g) to be a customer in good standing.

DETAILED DESCRIPTION OF THE PREFERRED EMBODIMENT

Figure 1:
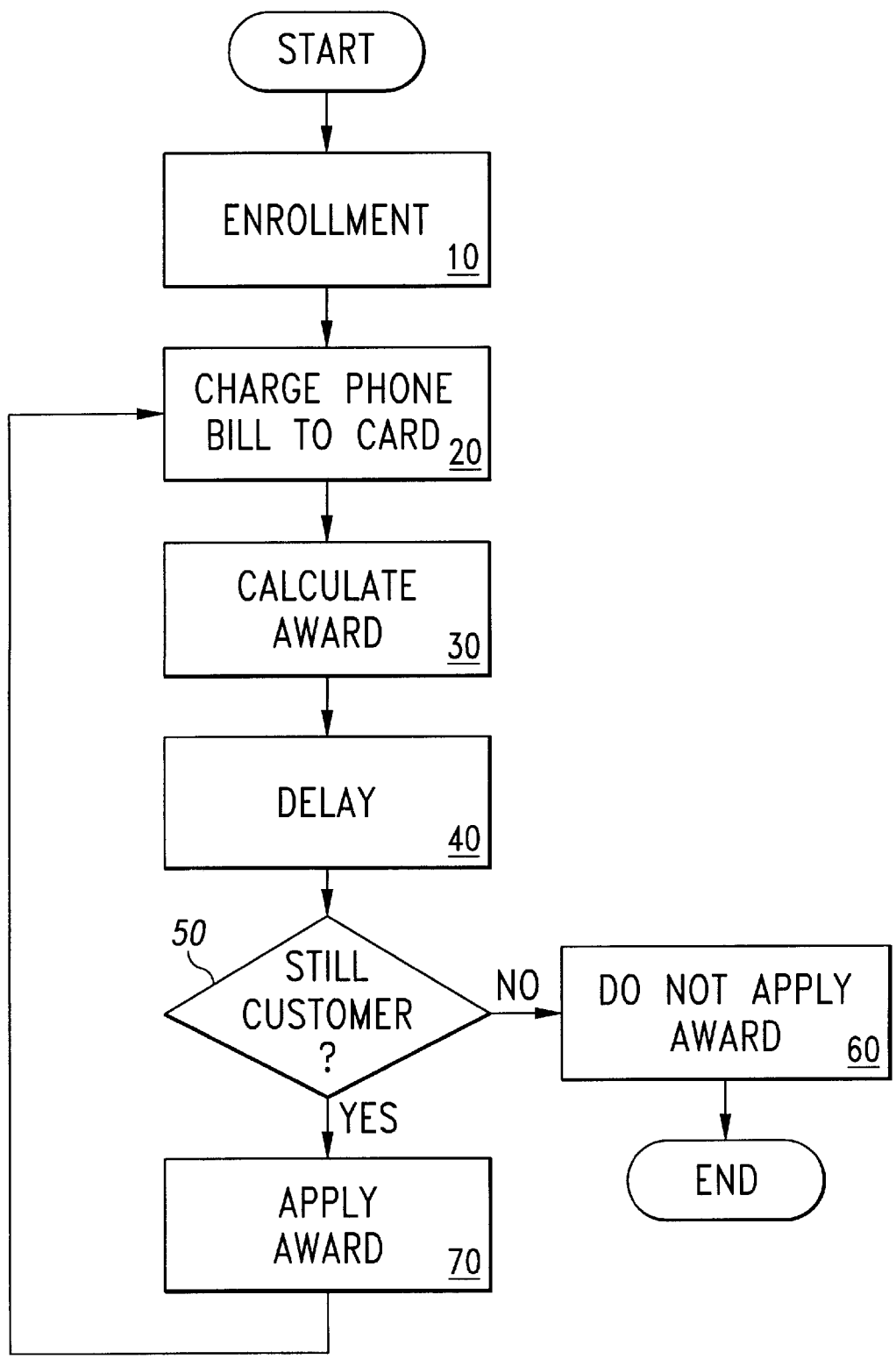
FIG. 1 is a schematic process flow diagram of a preferred embodiment process of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a preferred embodiment process flow of the system and method of the present invention. The preferred embodiment is illustrated herein using a long-distance telephone company as the exemplary Sponsor of the credit card; however, as discussed in greater detail hereinbelow, those having ordinary skill in the art will recognize that the system and method of the present invention lend themselves for use in many different businesses. References to a long-distance telephone company herein are therefore made only for illustrative purposes, and are not intended to limit application of the present invention to only Sponsors in that field.

Additionally, the system and method described hereinbelow refers to several different entities and the relationships that exist between them. For the purposes of this discussion, the following definitions will be used: Bank—the bank responsible for the traditional bank operations involved with credit cards (i.e.: card issuance, extension of credit (if required), customer service, etc.).

Incentive Card Administration—the incentive agency automated systems and resources responsible for incentive program enrollment, performance tracking, and awarding of award points.

Participant—the individual that participates in the incentive program by enrolling, earning award points, and utilizing the credit card for redemption of these earnings.

Sponsor—the sponsoring company who has acquired the services of the incentive agency to administer their incentive program through use of the credit card issued by the Bank.

As shown in FIG. 1, a preferred embodiment process of the present invention begins at step 10, in which Participants are enrolled into the incentive program. In the preferred embodiment, enrollment consists of issuing a credit card to the Participant, wherein the credit card is co-sponsored by the Bank issuing the credit card and a long-distance telephone company (the Sponsor). It is therefore necessary for the Participant to be approved by the Bank for issuance of a credit card, and also to have contracted with the Sponsor for the provision of long-distance telephone services. Under a contractual agreement supplied at the time of credit card issuance, the Participant agrees to the normal terms associated with the issuance of a credit card, but in addition, the Participant agrees to allow the Sponsor to bill the Participant's long-distance telephone charges directly to the credit card, instead of sending a bill for these charges to the Participant. This arrangement provides a benefit to the Sponsor in the form of quicker payment on its accounts receivable, as well as a likely reduction iii unpaid bills. The Bank also receives the benefit of potential interest income if these charges are not paid in full by the Participant every month. The Participant also receives a benefit by not receiving multiple bills and by only needing to write a single check to the Bank to pay for both general credit card charges and long-distance telephone charges. An additional benefit to the Participant is that the Participant will earn award points proportional (according to a predetermined formula) to at least the amount of charges made to the credit card for each billing cycle. The amount of charges which qualify for the earning of award points may be the total number of dollars charged to the credit card, only the dollars charged to the credit card by the Sponsor for long-distance services, or some other predetermined formula. As described in greater detail hereinbelow, these award points may eventually be converted into dollars which are credited to the credit card account.

After enrollment, the Participant will use the Sponsor's long-distance services and the Sponsor, at step 20, will bill any long-distance charges accrued by the Participant to the Participant's credit card. These charges may be billed to the credit card account as they accrue, or they may be billed on a monthly basis. The Sponsor therefore enjoys the convenience of simply notifying the Bank of the amount of charges for each Participant, and receiving payment from the Bank for these charges. It is not necessary for the Sponsor to print and mail a bill to each Participant, nor is it necessary for the Sponsor to incur the cost of collection on these bills (including delays in receiving payment, the cost of sending reminder notices, the cost of bad accounts which are written off, etc.).

On a periodic basis, typically at the end of each monthly billing cycle, the Incentive Card Administration will calculate at step 30 the number of award points earned by the Participant in the preceding period. This award calculation will be made according to a predetermined formula, such as, for example, two percent (2%) of the total amount of long-distance telephone charges billed to the credit card account during the preceding period. The present invention comprehends the use of other predetermined formulas for calculating the award amount.

The award calculated at step 30 may later be used to reduce the amount of a future credit card bill for the Participant. However, the process of FIG. 1 includes a delay period 40 which must occur before this award is available to the Participant. The delay will be for a predetermined time period, for example, two months (i.e., two billing cycles for the credit card). During this delay period, the award earned at step 30 is not available for use by the Participant, although the Participant may continue to use the credit card and to have his long-distance telephone charges billed directly to the credit card. The Participant will also continue to earn award points based on new charges to the credit card account during this delay period.

At step 50, the process of FIG. 1 determines if the Participant is still a customer in good standing, according to predetermined criteria. These criteria might include such things as: Is the customer still contracting with the Sponsor for the provision of long-distance telephone services, does the Participant still maintain a credit card account with the Bank, is the Participant's credit card account in good standing (i.e., not delinquent), etc. As an optional feature, the Participant may be required to be a customer in good standing both at the time the award is to be posted to his account and at the time the award is to be redeemed. In the typical case, the Sponsor will notify the Bank of each Participant's standing on a monthly basis. If the Participant does not meet any of the predetermined criteria established at step 507 the process of FIG. 1 proceeds to step 60 which determines that the award earned at step 30 will not be received by the Participant because the Participant has not met the predetermined criteria after the delay period 40.

If, however, it is determined at step 50 that the Participant is still a customer in good standing, then the award earned at step 30 prior to the delay period 40 is credited to the credit card account at step 70. The award may be credited to the credit card account in a variety of ways. For example, the award may be used to reduce the total credit card balance, the award may be used to reduce only the portion of the credit card balance attributable to the Participant's long-distance telephone charges (i.e. an award amount greater than the current charges for long-distance telephone services will not be applied to the credit card account), the award may be deposited into the credit card account for use id payment of any future long-distance telephone charges billed to the credit card, etc. In other words, the award may be applied to the credit card account in any manner, including ways which will provide further incentive for the Participant to purchase the Sponsor's goods and/or services. Furthermore, a time limit on redeeming the award may be imposed. For example, once the award is posted to the Participant's account, the Participant may be required to redeem the award by making new charges to his account exceeding the amount of the award, within a predetermined period of time after the reward is posted. Failure to do so would forfeit the award. The process then returns to step 20 in order to bill further long-distance telephone charges to the Participant's credit card account.

There are several important advantages obtained by the Bank, the Sponsor, and the Participant in the system and method of the present invention. For example, Participants can be encouraged to enroll in the preferred embodiment process described hereinabove with the promise of earning "free" telephone calls while a member of the program. Incentive is provided to the Participant not to switch telephone carriers because the earned award is not credited to the Participant's account except for amounts that were earned two or three months previously (for example). Therefore, there is always a built-up award amount that has been earned but not credited to the Participant, and this award amount will be forfeited if the Participant changes long-distance telephone providers. Additionally, the system and method of the present invention can provide incentive to the Participant to continuously use the Sponsor's long-distance telephone service. For example, step 50 of FIG. 1 may determine that the Participant is not a customer in good standing if the Participant has not used the Sponsol's long-distance telephone services during the past month. Also, awards may be credited to the credit card account at step 70 such that they may only be used to pay for long-distance telephone charges which are billed to the credit card account during the next ninety (90) days (for example).

Methods such as these provide a strong incentive for the customer to continuously use the Sponsor's services. The system and method of the present invention therefore has the distinct advantages of requiring the Participant to remain with the Sponsor for some period of time before earned awards can be redeemed, and it also provides an incentive not to discontinue use of the Sponsor's goods and/or services due to the possibility of forfeiting earned but unredeemed awards. Whereas credit cards were used in the past in order to simply make payments to merchants, the credit card of the present invention can be used as a device to incent loyalty to a particular Sponsor or program.

Although the preferred embodiment system and method described hereinabove utilizes a long-distance telephone carrier as the Sponsor for illustrative purposes, the system and method of the present invention will benefit any Sponsor which makes recurring charges to their customers. For example, utility companies, such as natural gas, electric, water, local telephone service providers, etc., cable television providers, cellular telephone carriers, insurance companies, mortgage companies providing automobile loans or other consumer credit, consumer buying clubs, department stores, etc. may be made a Sponsor in the system and method of the present invention and derive the same benefits described hereinabove in relation to the long-distance telephone carrier Sponsor. In any of these situations, awards may be earned for items billed by the Sponsor to the credit card, and the delayed payout of the award may be used to encourage customer loyalty to the Sponsor. In turn, the Bank sponsoring the credit card also gets the benefit of this loyalty. Furthermore, it is possible to have more than one Sponsor for each credit card account, such that the Participant may earn separate award points for charges to his credit card account by each of the Sponsors. An optional requirement in this situation is that the Participant would have to be a customer in good standing of all of the Sponsors at the time of payout in order to receive the award.

In another alternative embodiment of the present invention, the Sponsor's goods and/or services are not billed to the credit card account, but the Participant still receives an award based up on the amount of charges made to his credit card account. This award is paid after a predetermined delay and only if the Participant is still a customer in good standing of the Sponsor. This alternative embodiment may, for example, be attractive in situations where the Sponsor is a utility company and the locality in which the Participant lives has laws prohibiting utility bills from being charged to credit cards.

In a further embodiment of the present invention, the system and method of the present invention can allow the Sponsor to select a specific time period when awards can be earned and/or redeemed. For example, a department store chain may be a Sponsor of the credit card account and may want to provide incentive to the Participants to shop during the Christmas season. Therefore, the Sponsor may give are awkward (or an extra award) during the period preceding Christmas, for example, from November 15th through December 24th. Any purchases made at the Sponsor's store during this period will earn the awards. The awards earned may then be applied to the customer account at some time after the end of the award period, but only if the customer is still a Participant. For example, the awards may not be redeemable until the Christmas shopping period of the following year. The system and method of the present invention therefore will allow the Sponsor to fine-tune, to a certain extent, the shopping habits of the Participants so that there is an incentive for the Participants to make purchases at a particular time of year. This method may be used by any Sponsor who wants to focus sales during a particular time of year, such as to help with cash flow, inventory control, etc.

Those having ordinary skill in the art will recognize that the system and method of the present invention may be implemented using standard computer data processing equipment tied into standard systems already in place for the issuance, use, and billing of consumer credit card accounts. Such commonly available computer data processing equipment may be programmed to implement the data input, timing, calculating and output functions described herein, including the interface for data interchange to existing computers operated by the Bank for tracking of the credit card accounts. The system and method of the present invention provides advantages over prior art systems, by incenting credit card usage, incenting the Participant to remain a member of the Sponsor's group in order to redeem previous awards, incenting the Participant to buy the Sponsor's products and/or services in order to earn and redeem awards, by making it convenient for the Participant by having several recurring charges combined on one statement which can be paid with a single check.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for administration of an incentive award system, comprising the steps of:
    a) bank issuing a credit card account to a Participant;
    b) selling goods and/or services of a Sponsor to said Participant;
    c) charging said sales to said credit card account;
    d) determining an award amount based at least in part upon said charges;
    e) waiting a predetermined length of time;
    f) determining if said Participants still a customer in good standing of said Sponsor after said predetermined length of time; and
    g) if said Participant is determined at step (f) to be a customer in good standing, crediting said award amount to said credit card amount.

2. The method of claim 1, wherein step (b) comprises selling long-distance telephone services to said Participant.

3. The method of claim 1, wherein step (c) comprises charging said sales to said credit card account once per billing cycle of said credit card account.

4. The method of claim 1, wherein step (d) comprises utilizing computer data processing means to calculate said award amount based at least in part upon said charges.

5. The method of claim 1, wherein step (d) comprises determining an award amount as a predetermined percentage of said charges.

6. The method of claim 1, wherein step (e) comprises waiting two billing cycles of said credit card account.

7. The method of claim 2, wherein step (f) comprises determining if said Participant is still contracting with said Sponsor for provision of long-distance telephone services after said predetermined length of time.

8. The method of claim 1, wherein step (f) comprises determining if said credit card account is current after said predetermined length of time.

9. The method of claim 1, wherein step (g) comprises crediting said award amount to said credit card account, wherein said award amount may only be used against said Participant's charges of said Sponsor's goods and/or services made during a current billing cycle of said credit card account.

10. The method of claim 1, wherein step (g) comprises crediting said award amount to said credit card account, wherein said award amount may only be used against said Participant's charges of said Sponsor's goods and/or services made during a text billing cycle of said credit card account.

11. The method of claim 1, wherein said Participant forfeits said award amount if said Participant is determined at step (f) not to be a customer in good standing of said Sponsor after said predetermined length of time.

12. A method for administration of an incentive award system, comprising the steps of:
    a) causing a credit provider to issue a credit card account to a Participant;
    b) creating a database containing information about said credit card account;
    c) selling goods and/or services of a Sponsor to said Participant;
    d) charging said sales to said credit card account;
    e) using computer data processing means to calculate an award amount based at least in part upon said charges;
    f) waiting a predetermined length of time;
    g) determining if said Participant is still a customer in good standing of said Sponsor after said predetermined length of time; and
    h) causing said award amount to be credited to said credit card account information if said Participant is determined at step (g) to be a customer in good standing.

13. The method of claim 12, wherein step (c) comprises selling long-distance telephone services to said Participant.

14. The method of claim 12, wherein step (d) comprises charging said sales to said credit card account once per billing cycle of said credit card account.

15. The method of claim 12, wherein step (e) comprises determining an award amount as a predetermined percentage of said charges.

16. The method of claim 12, wherein step (f) comprises waiting two billing cycles of said credit card account.

17. The method of claim 13, wherein step (g) comprises determining if said Participant is still contracting with said Sponsor for provision of long-distance telephone services after said predetermined length of time.

18. The method of claim 12, wherein step (g) comprises examining said database information to determine if said credit card account is current after said predetermined length of time.

19. The method of claim 12, wherein step (h) comprises causing said award amount to be credited to said credit card account information, wherein said award amount may only be used against said Participant's charges of said Sponsor's goods and/or services made during a current billing cycle of said credit card account.

20. The method of claim 12, wherein step (h) comprises causing said award to be credited to said credit card account information, wherein said award amount may only be used against said Participant's charges of said Sponsor's goods and/or services made during a next, billing cycle of said credit card account.

21. The method of claim 12, wherein said Participant forfeits said award amount if said Participant is determined at step (g) not to be a customer in good standing of said Sponsor after said predetermined length of time.

22. A method for administration of an incentive award system, comprising the steps of:
    a) issuing a credit card account to a Participant;
    b) selling goods and/or services to said Participant;
    c) charging said sales to said credit card account;
    d) determining an award amount based at least in part upon said charges;
    e) waiting a predetermined length of time;
    f) determining if said Participant is still a customer in good standing of a Sponsor of said award system after said predetermined length of time; and
    g) if said Participant is determined at step (f) to be a customer in good standing, crediting said award amount to said credit card amount.

* * * * *